Figure 1:
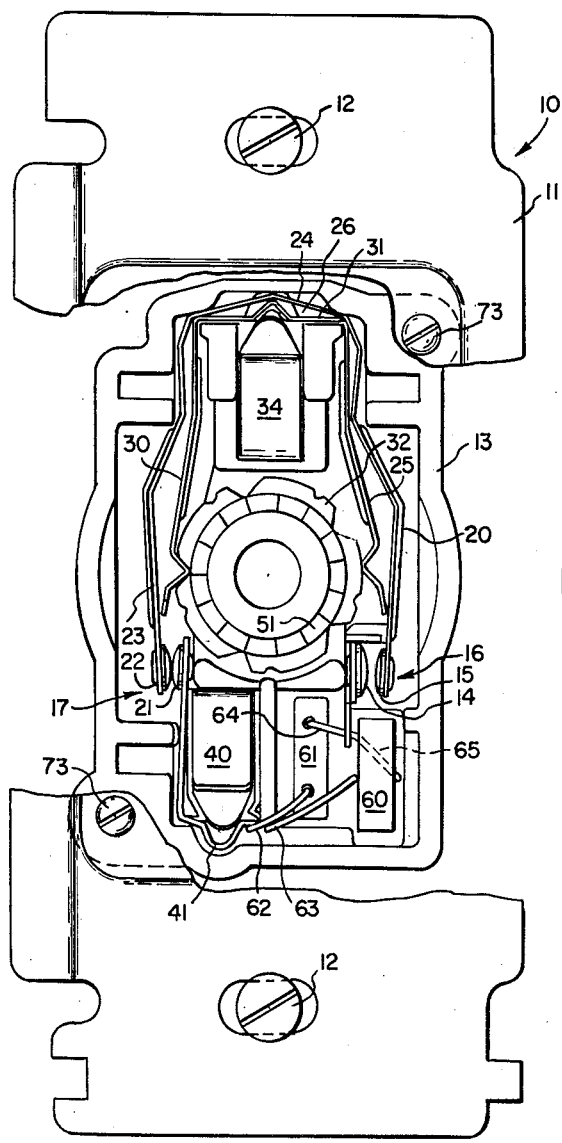

Jan. 22, 1963

M. H. FAULDS 3,075,123

SWITCHING DEVICE FOR VARYING OUTPUT OF LAMP LOAD

Filed Feb. 8, 1960

2 Sheets-Sheet 1

INVENTOR.
MALCOLM H. FAULDS
BY Clyde C. Blinn
ATTORNEY

Jan. 22, 1963 M. H. FAULDS 3,075,123
SWITCHING DEVICE FOR VARYING OUTPUT OF LAMP LOAD
Filed Feb. 8, 1960 2 Sheets-Sheet 2
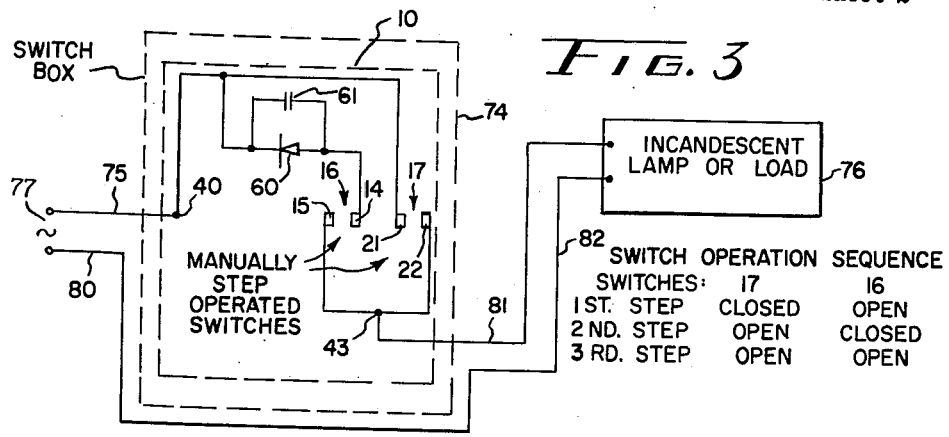
FIG. 3
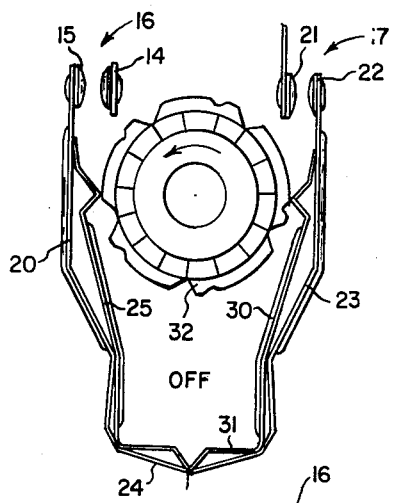
FIG. 4 — OFF
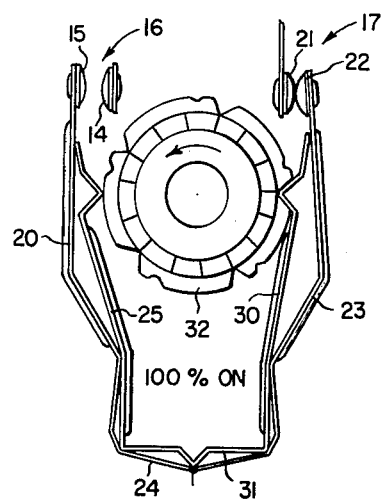
FIG. 5 — 100% ON
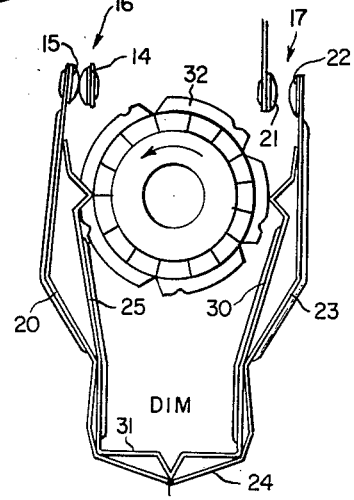
FIG. 6 — DIM
INVENTOR.
MALCOLM H. FAULDS
BY Clyde C. Blinn
ATTORNEY

United States Patent Office 3,075,123
Patented Jan. 22, 1963

3,075,123
SWITCHING DEVICE FOR VARYING OUTPUT
OF LAMP LOAD
Malcolm H. Faulds, St. Louis Park, Minn., assignor to Minneapolis-Honeywell Regulator Company, Minneapolis, Minn., a corporation of Delaware
Filed Feb. 8, 1960, Ser. No. 7,271
8 Claims. (Cl. 315—240)

The present invention is concerned with an improved switching device for varying the output of an incandescent lamp or load; in particular, a diode is selectively connected between the source of power and the lamp or load to decrease the power delivered to the lamp or load.

Controlling devices making use of rectifiers or diodes to decrease the power delivered to the lamp are old. Normally, a switching mechanism is provided for selectively connecting the lamp directly across a source of A.C. power or connecting the lamp to the source of power with a diode or rectifier in one current supply line. With the diode connected between the lamp and the source of power, the A.C. power is rectified to cut down the power delivered to the lamp.

When a diode rectifier is used in a switching apparatus or unit of this type, a predetermined amount of heat is generated by the diode for a given load which is connected to the unit. If the switching apparatus is to be placed in a conventional wall outlet box, the heat generated by the diode can result in a temperature rise of the unit.

In order to reduce the cost of such a switching unit, the size of the diode becomes an important factor. If the size of the diode is too small, either the controlled load must be limited to some low value or the temperature rise of the diode must be expected to be quite high. In order to use as large a load as possible with a given sized diode, various means are used to conduct heat away from the diode to keep the temperature of the diode as low as possible. The present invention is concerned with a novel manner of dissipating heat from the diode.

When such a switching unit using a diode is used with incandescent lamps, the surge current to the lamp may be several times higher than the operating current. If a switching unit using a diode for cutting down the power delivered to a lamp first energizes the lamp with the diode in the circuit, the warming up current or surge current to the lamp can be quite high for a given diode. Once the lamp is energized and the diode is placed in the circuit, the steady state current is much lower. Without being subjected to the surge current a smaller diode could meet the load requirements. For example, in an incandescent lamp, the initial surge current is possibly ten times the steady state current. If a diode is placed in the circuit when the lamp is first energized, the diode would have to be large enough to carry the high surge current even though it normally would only operate under the steady state condition. The present invention provides a novel sequence in the switching operation of the unit which always energized the lamp directly from the source of power on the first operation of the switching device. On the second operation of the switching device, the diode is interposed in the circuit; however, the lamp is assumed to be warmed up, and the diode only experiences a steady state current level.

An object of the present invention is to provide an improved switching device for connecting a diode in a power supply circuit for an incandescent lamp or load.

Another object of the present invention is to provide an improved switching device adapted to be placed in a conventional wall outlet box which contains a diode for cutting down the power delivered to a load connected to the device.

And still another object of the present invention is to provide a sequence of operation in a switching device so a load is always connected first to a source of power and then subsequently a diode is interposed in the circuit for reducing the power to the load.

And a further object of the present invention is to provide a switching device using a diode to reduce the power to a load and a condenser in parallel with the diode to reduce electrical disturbances caused by the diode.

A further object of the present invention is to provide a load switching device containing a diode and having an improved means for dissipating heat from the diode.

Figure 2:
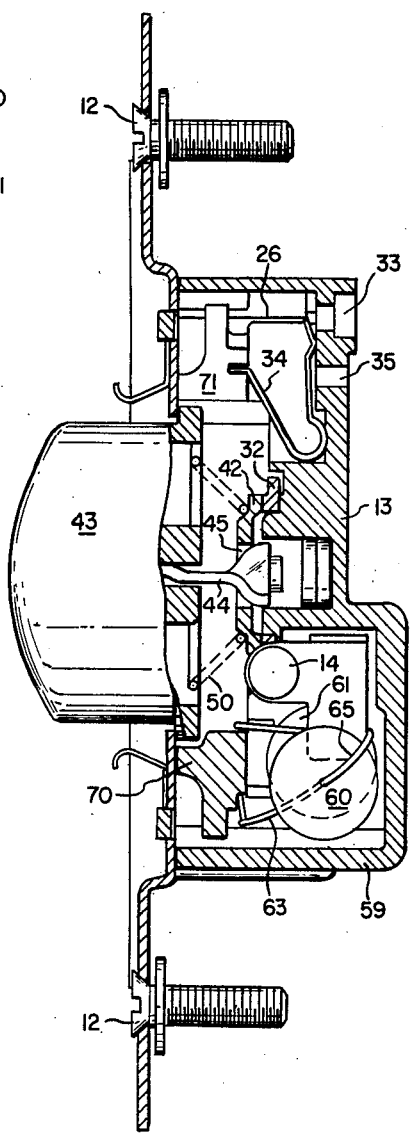

These and other objects of the present invention will become apparent upon the study of the following specification and drawing of which FIGURE 1 is a front cut-away view of the switching device, FIGURE 2 is a side cut-away view of the switching device looking toward the left of FIGURE 1, FIGURE 3 is a schematic circuit diagram of the present invention, FIGURES 4, 5, and 6 are front views of the cam operated switching mechanism showing the three possible positions of the switches when the cam is rotated.

Referring to FIGURE 1, a switching device 10 has a front mounting plate 11 which has associated screws 12 for mounting the unit in a conventional wall outlet box. A housing 13 contains a switch mechanism which is made up of two switches 16 and 17. A fixed contact 14 is mounted on housing 13 to cooperate with a movable contact 15 which is attached to one extremity of a flexible blade 20 to form switch 16. A second fixed contact 21 is mounted on the housing to cooperate with a movable contact 22 which is attached to one extremity of a flexible switch blade 23 to form switch 17. The upper extremities of blades 20 and 23 are connected by a metal portion 24 which is held in a notch 26 in the upper portion of housing 13 so the blades are rigidly held at their upper extremities.

A pair of flexible cam riders 25 and 30 which cooperate with cam 32 on opposite sides thereof are mechanically coupled by a portion 31 held in the upper part of housing 13 in notch 26. When cam rider 25 is lifted by a high portion on cam 51 to engage blade 20, movable contact 15 is lifted away from contact 14 to open a circuit which might be connected to the contacts. When cam rider 30 is lifted on a high portion of cam 51 to engage blade 23, movable contact 22 is lifted away from contact 21 to open the circuit which might be connected to the contacts.

Connecting members 24 and 31 are held in notch 26 so there is an electrical connection between the two members. Referring to FIGURE 2, a hole 33 is provided on the back side of housing 13 for receiving a conventional number 14 wire to connect the switching unit to a load. When the wire is inserted in the hole 33, the wire is held by a spring clip 34 which is connected to member 31 to provide the electrical connection to the movable contacts 15 and 22. The connection provided by spring clip 34 is of a conventional type which provides for a connection without a screw terminal. When a tool or some sort is inserted in a hole 35 in the rear of housing 13 to engage spring 34, the spring is moved to the left, in FIGURE 2, to quickly release the wire in hole 33. A similar spring connecting terminal 40 is shown in the lower portion of the unit in FIGURE 1; so that, when a wire is inserted in the rear of the housing 13 in another hole, not shown, the wire is held by spring 40 in a manner to make an electrical connection to the bus 41 which is connected to fixed contact 21.

Referring to FIGURE 2, a cam operator 42 which meshes with cam 32 provides for small increments of rotation of cam 32 in a counterclockwise direction when viewing the cam in FIGURE 1. Every time button 43 is depressed to the right as shown in FIGURE 2, a drive member 44 is moved to the right. Member 44 is connected to cam operator 42 by slot 45; so that, upon movement of drive member 44 to the right, movement of operator 42 and cam 32 in a counterclockwise direction is accomplished. A spring 50 provides for a normal return of button 43 when the depressing force is removed. Cam operator 42 has teeth which engage with teeth 51 of cam 32; however, upon the return movement of operator 42 when button 43 is released to move to the left as shown in FIGURE 2, operator 42 can move clockwise without moving cam 32.

A diode or rectifier 60 and a condenser 61 are mounted in an enlarged portion 59 or housing 13. One terminal of both condensers 61 and diode 60 are electrically connected to bus 41 by wires 62 and 63, respectively. A second terminal of diode 60 and condenser 61 are connected to fixed contact 14 by wires 64 and 65, respectively.

Members 70 and 71 as shown in FIGURE 2 are small inserts which are used to hold the terminal springs 40 and 34, respectively, in position. With members 70 and 71 and push button 43 as shown, plate 11 is attached to base 13 by fastening means or screws 73.

The possible electric circuit in which switching device 10 is used is shown in FIGURE 3. A switch box 74 might be a conventional wall outlet box in which unit 10 is installed. The power supply wire 75 would lead into box 74, and the load wire 81 would extend from box 74 to an incandescent lamp or load 76. Wires 80 and 82 are connected outside of box 74 as the wires are not connected in any manner to device 10. Wire 75 is connected to device 10 by terminal 40, and wire 81 leading to the load is connected to terminal 43. Terminal 43 is connected to the movable contacts 15 and 22. Fixed contact 14 is connected to terminal 40 through the parallel circuit comprising diode 60 and condenser 61. Fixed contact 21 is connected to terminal 40.

By means of the cam 32 as shown in FIGURE 1, the sequence of operation of the switching unit 10 is such to first close switch 17 to connect the incandescent lamp or load directly to the power source 76. A second operation of the button 43 as shown in FIGURE 2 causes cam 32 to open the switch 17 and close switch 16. The load is then connected through the circuit comprising the parallel connection of diode 60 and condenser 61. The diode rectifies the A.C. voltage from the power source 76 to cut down the power delivered to the load to reduce the illumination of the lamp or reduce the current to the load. Obviously, the load must be limited to some device which normally operates on A.C., but a reduced level of operation can exist when the A.C. voltage is rectified. For example an incandescent lamp would first be energized to 100 percent lumination when switch 17 is closed. A subsequent operation of switch 16 would energize the incandescent lamp through the diode 60 to reduce the level of illumination to approximately one-half of the illumination when directly energized by the source of power. Condenser or impedance 61 is placed across the diode to protect the diode and reduce the effect of the switching device when in the dim position on radio, television, and other apparatus connected to the same power source.

The sequence of operation of the switch is specifically selected to always first energize the load directly from the power source. In the case of an incandescent lamp where the warm up or surge current of the lamp is approximately ten times the normal operating current, a heavy load is imposed upon the diode if the lamp is first energized through the diode. By energizing the lamp directly from the source of power, the lamp is always warmed up before the lamp is energized through the reduced illumination circuit including the diode. This prevents the warm up or surge current from being imposed on the diode. Such a design is quite important as the size of the diode selected depends upon the surge load which it must withstand. When no surge load exists, a smaller diode can be used for the given steady state load. Since diodes of the type used for diode 60 greatly increases in cost as the current rating increases, the sequence of operation to always energize the load first by directly connecting it across the source of power provides for the use of a less expensive diode.

In FIGURES 4, 5, and 6 the position of the switch contacts for the three steps is shown. When the cam is moved from the position as shown in FIGURE 4, the cam first moved to the position shown in FIGURE 5 to close switch 17 for the 100 percent energization level. On the next operation of the cam, switch 16 is closed as shown in FIGURE 6 for the reduced energization level of the load.

The connections 24 and 30 which connect the members 23 and 20, 25 and 30, respectively provide a heat sink to dissipate heat that is generated in the unit. Normally heat dissipated from a switch is conducted away from the switch through the contact and the contact blades. Heat from the contact is dissipated in this manner in the present switching unit; however, heat is also generated by diode 60. By connecting the diode 60 to the fixed contact 14, heat from the diode is dissipated through the conductor 65 and the contacts into the contact blade 20. The heat is then conducted around the spring through connecting member 24 and flexible switch blade 23. Heat is also conducted to the member 31 and the spring riders 25 and 30. Since the heat is conducted along these members and they are spaced relatively close to the outside of the housing 13, the temperature of the diode is reduced considerably.

The dissipation of heat from the diode is relatively important in reducing the size of the diode which is necessary for controlling a certain sized load. In an apparatus of this type, Underwriters Laboratory is quite concerned about the temperature rise to prevent a device of this sort from causing fire damage. When a small diode is used for a given load, the temperature is often the limiting factor for the size of the load. If the heat from the diode can be dissipated to keep the temperature low, the current rating of the diode is increased. By dissipating the heat from the diode in the manner shown, the current rating of the diode is greatly increased without exceeding a harmful temperature.

In marketing a product like the present invention, the ultimate cost to the consumer is quite important. In both of the mentioned features of the present invention, that is, where the sequence always provides for the warm up of the initial energization of the load directly from the source of power and the use of the switch blades as a "heat sink" for conducting the heat from the diode are very important in reducing the size of the diode which is necessary for a particular load. The reduction in the size of the diode has a direct bearing upon the cost of the unit, and the lower the cost the greater the market potential.

The applicant has shown his invention in a particular manner, however, the intention is to limit the scope of the invention only by the appended claims in which I claim:

1. An electric load switching device, a switch housing adapted to be mounted in a conventional wall electric box to which a power supply circuit and a load circuit are attached, an input terminal mounted on said housing, an output terminal mounted on said housing, said terminals being adapted to be connected between the power supply circuit and the load circuit to control the supply of power to the load, a rectifier contained in said housing, a first switch, a second switch, manual switch operating means connected to said first and second switches whereby said switch operates in a sequence as follows when said manual means is operated in a step like manner; said first switch is closed on a first operation of said manual means, said second switch is closed on a second operation of said manual means, and both said first and said second switches are open when said manual means is operated a third operation, electrical circuit means connecting said first switch between said first and second terminals, and second electrical circuit means connecting said rectifier and said second switch in series between said first and second terminals so that upon the manual operation of said switch operating means the load is first energized through said first circuit to initially warm up the load and upon a second manual operation of said operating means the load is energized at a reduced level through said second circuit.

2. In an electrical switching device, a housing, an input terminal and an output terminal on said housing, a first switch having a movable and a fixed contact, a second switch having a fixed and movable contact, an electric conductor support member connecting said movable contacts, said member having a good thermal conductivity and extending along the inner perimeter of said housing, a diode rectifier, means connecting said rectifier between said input terminal and said fixed contact of said second switch means, switch operating means, means connecting said switch operating means to close said first and second switches in the order named by moving said movable contacts, said second switch when closed providing a heat conducting path between said diode and said member to conduct heat away from said diode to said housing to reduce the operating temperature of said diode.

3. An electric lamp switching device, a switch housing adapted to be mounted in a conventional wall electric box to which a power circuit and a load circuit are attached, a first terminal mounted on said housing, a first output terminal mounted on said housing, said terminals being adapted to be connected between the power circuit and the load circuit to control the supply of power to the load, a rectifier contained in said housing, a first switch, a second switch, manual switch operating means connected to said first and second switches whereby said switch operates in a sequence as follows when said manual means is operated in a step like manner; said first switch is closed on a first operation of said manual means, said second switch is closed on a second operation of said manual means, and both said first and said second switches are open when said manual means is operated a third operation, electrical circuit means connecting said first switch between said first and second terminals, and second electrical circuit means connecting said rectifier and said second switch in series between said first and second terminals so that upon the manual operation of said switch operating means the load is first energized through said first circuit to initially warm up the load and upon a second manual operation of said operating means the load is energized at a reduced level through said second circuit, said second electrical connection comprising a member extending throughout said housing and having a good thermal conduction characteristic so heat from said rectifier conducted to said housing to increase the heat radiation area and lower the temperature of said rectifier.

4. In an electrical switching device, a housing, an input terminal and an output terminal on said housing, a first switch having a movable and a fixed contact, a second switch having a fixed and movable contact, an electric conductor mounting member connecting said fixed contacts, said member having a good thermal conductivity and extending along the inner perimeter of said housing, a diode rectifier, means connecting said rectifier between said input terminal and said fixed contact of said first switch means, and switch operating means for sequentially closing said switches, said member acting as a heat sink to conduct heat away from said diode when said first switch is closed.

5. An electric load switching device, a switch housing adapted to be mounted in a conventional wall electric box to which a power supply circuit and a load circuit are attached, an input terminal mounted on said housing, an output terminal mounted on said housing, said terminals being adapted to be connected between the power supply circuit and the load circuit to control the supply of power to the load, a rectifier and a condenser contained in said housing, a first switch, a second switch, manual switch operating means connected to said first and second switches whereby said switch operates in a sequence as follows when said manual means is operated in a step like manner; said first switch is closed on a first operation of said manual means, said second switch is closed on a second operation of said manual means, and both said first and said second switches are open when said manual means is operated a third operation, electirical circuit means connecting said first switch between said first and second terminals, and second electrical circuit means connecting said rectifier and said second switch in series between said first and second terminals so that upon the manual operation of said switch operating means the load is first energized through said first circuit to initially warm up the load and upon a second manual operation of said operating means the load is energized at a reduced level through said second circuit, circuit means connecting said condenser in parallel with said rectifier to reduce electrical disturbances affecting the power supply circuit when said rectifier is connected in series with the load.

6. In an electrical switching device adapted to be connected to an A.C. voltage source, a housing, an input terminal and an output terminal on said housing, a first switch having a movable and a fixed contact, a second switch having a fixed and movable contact, an electric conductor support member connecting said movable contacts, said member having a good thermal conductivity and extending along the inner perimeter of said housing, a diode rectifier, means connecting said rectifier between said input terminal and said fixed contact of said second switch means, an electrical impedance, means connecting said impedance in parallel with said diode, switch operating means, means connecting said switch operating means to close said first and second switches in the order named by moving said movable contacts, said second switch when closed providing a heat conducting path between said diode and said member to conduct heat away from said diode to said housing to reduce the operating temperature of said diode, said electrical impedance being effective to reduce the effect of said diode on the voltage source.

7. An electric lamp switch device for reducing the illumination of an incandescent lamp comprising, a rectifier, manually operated snap-acting switch means sequentially operating in the order named through a first position and a second position from an off position, said first and second positions providing a first and second closed circuit, respectively, an incandescent lamp, circuit means including said first circuit adapted to connect said lamp to an A.C. source of power to provide full illumination of said lamp to warm up said lamp to reduce a current consumption from a high initial value to a low steady state value, and a second circuit means including said second circuit and said rectifier adapted to connect said warmed up lamp to the source to provide a reduced illumination and not impose said high current on said rectifier.

8. In an electric switching device for reducing an illumination level of a lamp, a first switch, a second switch, manually operated means connected to said switches for closing said switches sequentially in a snap-acting manner in the order named, a rectifier, a source of power, electrical connection means connecting an electric incandescent lamp load to said source of power through said first switch upon a first operation of said manually operated means so that the lamp is initially fully energized so the surge current is reduced as the lamp warms up and the lamp current attains a steady level, second electrical connection means connecting the electrical lamp load to said source of power through said second switch and said rectifier, said second electrical connection means is established after said first electrical connection means upon a second operation of said manually operated means whereby said lamp is already warmed and said lamp current is maintained at a value less than said steady state value to prevent said rectifier from receiving said initial surge current.

References Cited in the file of this patent

UNITED STATES PATENTS

| | | |
|---|---|---|
| 2,896,125 | Morton | July 21, 1959 |
| 2,981,866 | Tsien et al. | Apr. 25, 1961 |